(12) United States Patent
Sirianni et al.

(10) Patent No.: US 8,458,138 B1
(45) Date of Patent: Jun. 4, 2013

(54) DYNAMIC DISCOVERY OF STORAGE RESOURCE TOPOLOGY

(75) Inventors: Eric Sirianni, Cary, NC (US); Philip Bryan Clay, Raleigh, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 783 days.

(21) Appl. No.: 12/611,884

(22) Filed: Nov. 3, 2009

(51) Int. Cl.
*G06F 7/00* (2006.01)
*G06F 17/00* (2006.01)

(52) U.S. Cl.
USPC ............ 707/679; 707/686; 707/798; 711/162

(58) Field of Classification Search
USPC .............. 707/679, 686, 798; 711/162; 714/20
See application file for complete search history.

(56) References Cited

U.S. PATENT DOCUMENTS

| | | | | |
|---|---|---|---|---|
| 5,883,881 A | * | 3/1999 | Croslin | 370/221 |
| 6,442,663 B1 | * | 8/2002 | Sun et al. | 711/202 |
| 7,386,752 B1 | * | 6/2008 | Rakic et al. | 714/2 |
| 7,917,474 B2 | * | 3/2011 | Passey et al. | 707/655 |
| 8,127,095 B1 | * | 2/2012 | Colgrove et al. | 711/162 |
| 2005/0228787 A1 | * | 10/2005 | Linden et al. | 707/3 |
| 2009/0037418 A1 | * | 2/2009 | Xu et al. | 707/8 |
| 2009/0077625 A1 | * | 3/2009 | Van Der Linden et al. | 726/1 |
| 2010/0312754 A1 | * | 12/2010 | Bear et al. | 707/685 |

* cited by examiner

*Primary Examiner* — Shew-Fen Lin
(74) *Attorney, Agent, or Firm* — Blakely, Sokoloff, Taylor & Zafman LLP

(57) ABSTRACT

In one aspect, dynamic determination generates a storage resource graph corresponding to a storage topology. The generating may comprise iterating through storage resources in the storage topology and using a discovery handler to generate a node in the storage resource graph corresponding to each of the iterated storage resources. Dynamic determination generates an operation graph by iterating through nodes in the storage resource graph and using an operating handler to generate operation-specific metadata corresponding to each iterated node of the storage resource graph. Dynamic generating executes the operation graph in a way specific to the operation.

8 Claims, 12 Drawing Sheets

DYNAMIC DISCOVERY OF STORAGE RESOURCE TOPOLOGY

FIELD OF THE INVENTION

This invention relates generally to storage management, and more particularly to restoration and discovery.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2008, NetApp, Inc., All Rights Reserved.

BACKGROUND

Storage products frequently provide value by using low-level operations on a storage controller to provide high level operations upon application-level and host-level objects. A basic requirement for these products is an accurate representation of the storage stack: from the top-level data management containers down to the underlying storage controller resources.

Existing techniques for obtaining this representation are specific to certain types of storage resources and are unable to build an accurate representation of changing storage structures. Each time the underlying structure changes, the implementation of the existing techniques needs to be changed to accurately discover the structure. This requires re-writing and re-testing of the implementation.

SUMMARY

In one aspect, dynamic determination generates a storage resource graph corresponding to a storage topology. The generating may comprise iterating through storage resources in the storage topology and using a discovery handler to generate a node in the storage resource graph corresponding to each of the iterated storage resources. Dynamic determination generates an operation graph by iterating through nodes in the storage resource graph and using an operating handler to generate operation-specific metadata corresponding to each iterated node of the storage resource graph. Dynamic generating executes the operation graph in a way specific to the operation.

In another aspect, dynamic determination of restore scope traverses an arbitrary storage stack to generate a restore scope graph that can be used in a restore operation. Dynamic determination receives a bound identifier identifying a storage component. Dynamic determination generates a data structure comprising a hierarchy of interrelated storage components annotated with restore scope designations. To generate the designations, dynamic determination traverses the hierarchy of interrelated storage components along a primary path specified by a position of the identified storage component in the hierarchy. As dynamic determination traverses each storage component along the primary path, dynamic determination assigns a restore scope designation of fully restorable, partially restorable, or not restorable based on the interrelationship between each storage component and a related storage component. Dynamic determination returns the annotated storage graph.

In another aspect, the annotated storage graph is analyzed to determine a plurality of restore operations based on the restore scope designations. A duration and a resource cost for each of the plurality of restore operations is determined and the plurality of restore operations are ranked based on the cost and duration.

In another aspect, the ranked restore operations are displayed on a display device. A selection of one of the restore operations is received, and the selected restore operation is performed.

In still another aspect, on otherwise partially restorable component is determined to be revertible and the designation of the partially restorable component is changed to revertible. The revertible storage component is considered fully restorable for designation assignment purposes.

The present invention is described in conjunction with systems, clients, servers, methods, and computer-readable storage media of varying scope. In addition to the aspects of the present invention described in this summary, further aspects of the invention will become apparent by reference to the drawings and by reading the detailed description that follows.

DETAILED DESCRIPTION

Figure 1:
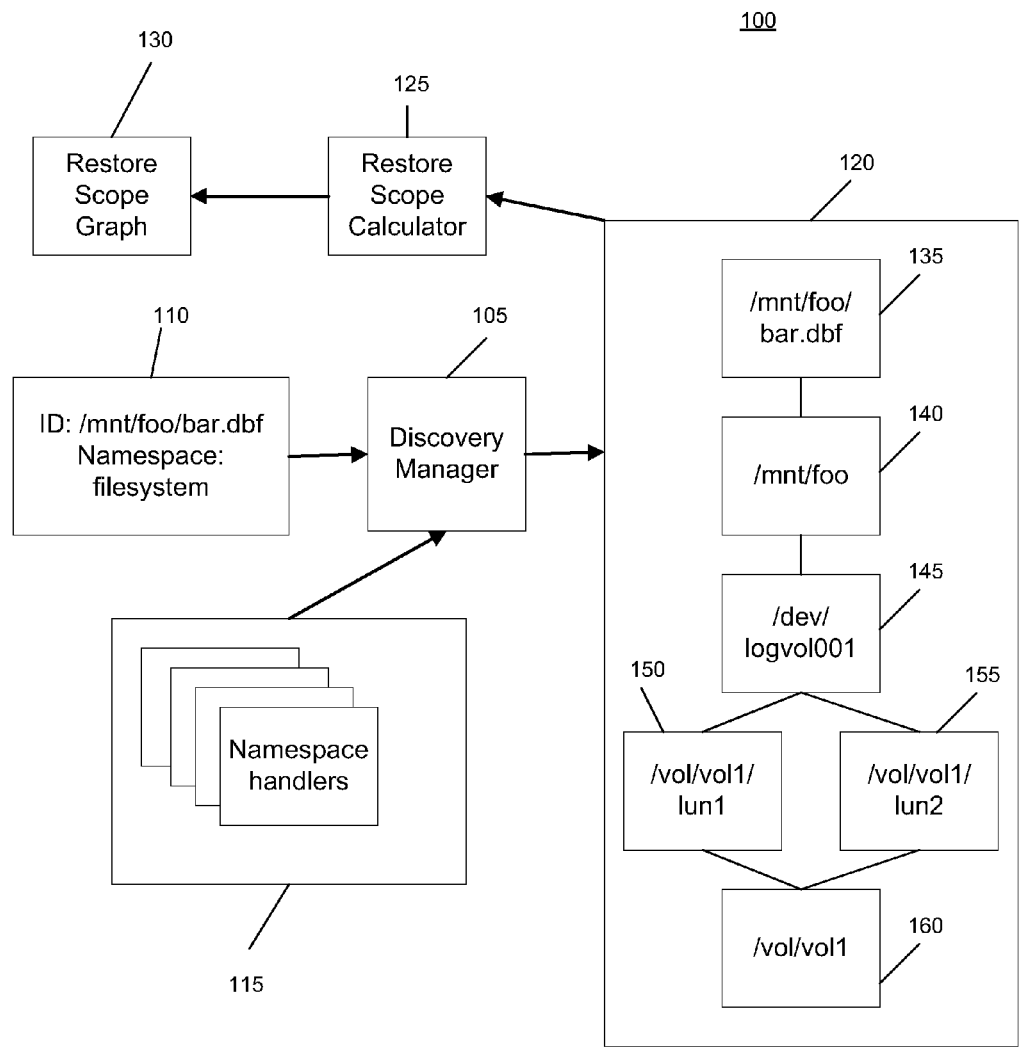
FIG. 1 is a diagrammatic overview of an embodiment of dynamic determination of restore scope.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Dynamic determination of restore scope traverses a storage stack of arbitrary size and complexity to generate a restore scope graph that can be used in a restore operation. The core of dynamic determination does not need to be rewritten or retested if the storage stack changes. A system level overview of the operation of an embodiment of dynamic determination of restore scope is described by reference to FIG. 1. Storage system 100 includes discovery manager 105, which uses namespace handlers 115 to generate storage graph 120 from the underlying storage stack (not shown) based on identifier input 110. Restore scope calculator 125 receives storage graph 120 as an input and uses graph 120 to generate restore scope graph 130. A restore manager (not shown) analyzes a restore scope graph 130 to determine how to restore a storage component referred to by input 110. The graph may be an abstract data structure containing nodes connected by edges.

In one embodiment, input 110 is a bound identifier corresponding to one or more storage components to be restored. For example, input 110 includes the identifier "/mnt/foo/bar.dbf." The identifier is bound by namespace "filesystem." Bound identifiers may only be unique within the bounding namespace. The identifier included in input 110 may refer to more than one storage component across different namespaces, but only refers to a single storage component within the namespace "filesystem." A namespace may be an abstract container providing context for items within the container. For example, the identifier "/mnt/foo/bar.dbf" is bound by the namespace "filesystem," then the bound identifier is unique within that namespace. The identifier may not be unique across different namespaces. For example, the identifier "/mnt/foo/bar.dbf" may refer to a different storage resource if bound by the identifier "otherfilesystem."

Storage graph 120 is a graph of storage components, beginning with the input 110, which corresponds to graph node 135. From node 135, discovery manager 105 traverses through the storage topology: components 140, 145, 150, 155, through terminal component 160. The resulting graph 120 describes the storage topology from the storage component 135 corresponding to input 110 through terminal component 160. Discovery manager 105 can discover storage graphs of arbitrary complexity and size using namespace handlers 115. Discovery manager 105 is described in greater detail below in conjunction with FIG. 7.

A namespace handler corresponds to one or more types of storage components. For example, a particular namespace handler may discover volumes such as volume 160. In one embodiment, namespace handlers 115 may be added or removed at runtime. In this and other embodiments, discovery manager 105 does not need to be recompiled, modified, etc. in response to a change in namespace handlers 115.

In one embodiment, restore scope graph 130 is an annotated storage graph. Each node of the storage graph corresponds to a storage component, as in storage graph 120. Restore scope calculator 125 annotates each node of the restore scope graph to indicate whether the storage component may be fully or partially restored. Restore scope calculator 125 is described in greater detail below in conjunction with FIG. 2. Restore scope graphs are described in greater detail below in conjunction with FIGS. 3-5. An example of the logic performed by a restore scope calculator 125 is: if all the nodes with a "stored-in" relationship to a current node (e.g., all files in a folder) are designated as fully restorable, then the current node may be designated as fully restorable. Alternatively, if one of the nodes with a "stored-in" relationship with the current node is designated as partially restorable, the current node would also be designated as partially restorable.

In another alternative embodiment, all the nodes with a "stored-in" relationship with a current node may be designated as fully restorable, but external relationships may cause the current node to be designated as partially restorable. One external relationship is the use of the storage component by applications outside the control of the restore process. Another external relationship is a replication relationship—such a relationship may get disrupted or damaged if the storage component is fully restored. In still another alternative embodiment, a storage component may be revertible. A revertible storage component is a partially restorable storage component that can be readily reverted to its modified state following a restore operation. In one embodiment, a revertible storage component is treated as a fully restorable component for purposes of calculating restore scope. Revertible storage components are described in greater detail below in conjunction with FIG. 6.

Other embodiments other than restore scope calculation are within the scope of this invention. For example, a backup operation can create a storage-level snapshot of a collection of storage-using resources. The backup operation may take a storage resource graph as input and output a backup artifact, for example, the storage-level snapshot. The backup operation may ensure that the state of each resource in the storage topology is consistent within the storage-level snapshot. If one of the resources in the storage graph is a database, that database must be appropriately quiesced during the underlying snapshot operation. If multiple resources in the storage graph need to be quiesced, those resources are quiesced and un-quiesced in the correct order. For example, if a database occurs on top of a file system in the storage topology, the sequence of actions may be: 1) quiesce database (e.g., place database in a hot backup mode); 2) quiesce file system (e.g., freeze the filesystem); 3) create a storage-level snapshot; 4) un-quiesce the filesystem (e.g., thawed); and 5) un-quiesce the database (e.g., take database out of hot backup mode).

An embodiment of the backup operation uses the graph abstraction to obtain the correct sequencing in a generic and extensible manner. The backup operation may take a storage resource graph created during a discovery operation. Discovery operations are described in greater detail below in conjunction with FIG. 7. In one embodiment, a snapshot step graph factory module takes the storage resource graph and registered snapshot step factory instances as input and produces a snapshot step graph as output. The snapshot step graph may initially have a single node corresponding to each node in the storage resource graph. The snapshot step factory may post-process the snapshot step graph to allow nodes to coalesce for performance reasons. The resulting snapshot step graph may be executed as follows. 1) perform a depth-first post-order traversal on a reversed snapshot step graph, invoking the commit method on each node in the graph; 2) perform a depth-first post-order traversal on the snapshot step graph, invoking the commit method on each node in the graph. This ordering ensures that the proper sequencing of quiesce/un-quiesce and snapshot actions as described above. The resulting backup artifact encapsulates the storage resource graph and additional metadata about the backup operation.

A depth-first search may be performed as follows: a node is selected as a root node. From the root node, the search proceeds as far as possible along each branch before backtracking. A post-order search may perform the following operations at each node: traverse the left sub-tree, traverse the right sub-tree, process the node.

Another embodiment includes a protect operation. The protect operation may trigger propagation of a backup along one or more pre-existing replication relationships or "data protection relationships." Replication relationships may be defined on individual resources in the storage topology. An embodiment uses the graph abstraction to perform the protect operation in an extensible manner. A protection step graph factory module may take a backup artifact and registered protection step factory instances as input and produce a protection step graph as output. The protection step graph may be executed by simply invoking each protection step node in the graph. Ordering may not be important. The resulting protected backup artifact encapsulates both the backup artifact and additional metadata about the replication relationships used for the data protection.

Another embodiment includes a clone create operation. A clone may be a replication of a storage resource that doesn't require additional storage space at the time of creation. Additional storage space is needed as the clone changes from the originally replicated storage resouce. The clone create operation may create clones of all storage-using resources in a backup. The initial state of an individual resource clone matches the state of the corresponding resource at the time the backup was made. The resource clone is logically distinct from the original resource, although the clone may share the same physical state with the original. The clone may be created using any of the replicated copies of the backup. An embodiment uses the graph abstraction to properly sequence the steps comprising a clone create operation in a generic and extensible manner. A clone creation step graph factory module takes a backup artifact or a protected backup artifact and registered clone creation step factory instances as input and produces a clone creation step graph as output. Initially there may be a single node in the clone creation step graph corresponding to each node in the storage resource graph. The clone creation step factory may post-process the clone creation step graph to allow nodes to coalesce for performance reasons. The resulting clone creation step graph may be executed by invoking each node in a depth-first post-order traversal. This traversal ordering ensures that for any given node, the children of that node will be cloned before the node itself. This corresponding to the "bottom up" process of construction a storage resource stack. The resulting clone artifact encapsulates the storage resource graph representing the resource clones.

An embodiment of the invention includes a clone delete operation. The clone delete operation destroys an existing clone. The graph abstraction may be used to properly sequence the steps comprising a clone delete operation in a generic and extensible manner. A clone deletion step factory module takes a clone artifact and registered clone deletion step factory instances as input to generate a clone deletion step graph. Initially, the clone deletion step graph includes a single node for each node in the storage resource graph. The clone deletion step factory may post-process the clone deletion step graph to allow nodes to coalesce for performance reasons. The resulting clone deletion step graph is executed by invoking each node in a reversed clone deletion step graph in a depth-first post-order traversal. This traversal ordering ensures that for any given node, the parents of that node will be destroyed before the node itself. This corresponds to a "top down" process of destroying a storage resource stack.

Figure 2:
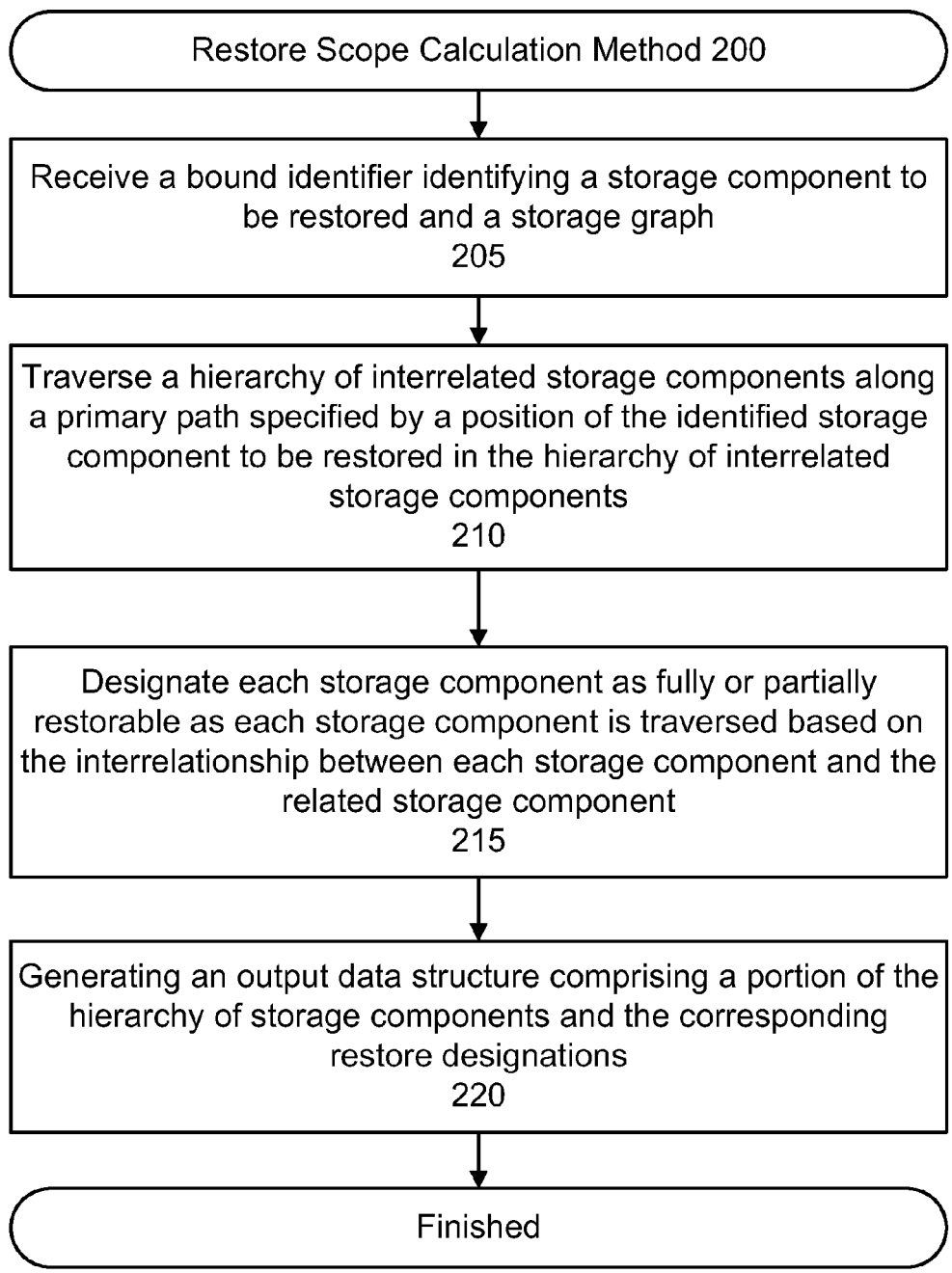
FIG. 2 is a flow diagram illustrating an embodiment of a restore scope calculation method to be performed by a data processing system.

FIG. 2 illustrates a restore scope calculation method 200 which may be performed by a data processing system described below in conjunction with FIG. 10. At block 205, the method 200 receives a bound identifier identifying a storage component to be restored and a storage graph. The bound identifier may identify multiple storage components, or the method 200 may receive multiple resource identifiers. In one embodiment, a bound identifier is guaranteed to be unique within a bounding namespace.

At block 210, the method 200 traverses a hierarchy of interrelated storage components along a primary path. The primary path is implicitly specified by the position of the identified storage component in the hierarchy of interrelated storage components as the path between the identified component and a terminal component. The hierarchy of interrelated storage components may also be referred to as the storage stack, storage topology, etc. In one embodiment, the traversal may be implemented in a recursive fashion, as described in greater detail below in conjunction with FIG. 7. In one embodiment, the method 200 only receives the bound identifier and generates the storage graph. In another embodiment, the method 200 receives a storage graph with the components to be restored already designated as fully restorable in the storage graph.

At block 215, the method 200 assigns a restore designation to each traversed storage component. The designation may be "FULL" to indicate that a storage component is fully restorable. In one embodiment, a fully restorable storage component is expressly designated in a restore request or is designated as restorable by the restore scope calculation method. A storage component may be designated as "REVERTIBLE" if it is a temporary file or any other file designated as revertible by a user. Revertible files are treated as fully restorable for restore scope calculations, but are not designated by the restore request. In one embodiment, a file included in the restore request must be restored by a corresponding restore operation, while a revertible file may be restored if restoring the revertible file allows a more efficient restore operation to be performed. For example, restoring an entire file system may be more efficient than restoring individual files in the file system. If a portion of the files in the file system are included in a restore request, and the remaining files in the file system are revertible, then the more efficient file system restore can be performed instead of individually restoring each of the files in the restore request. In one embodiment, the restore scope calculation only examines the relationship of a storage component to other storage components and external relationships involving the storage component. In this embodiment, the content of storage components is ignored.

Alternatively, the designation may be "PARTIAL" to indicate that a storage component is partially restorable. For example, if a folder contains a two files, and only one of the files is part of the restore request, the folder will be considered partially restorable. A storage component may also be designated as "NOT" restorable if no portion of the storage component, or none of its children storage components are restorable. In one embodiment, individual files may be designated as partially restorable. For example, a database file can include several tables, but a subset of the tables are designated as restorable. In this example, the database file would be designated as partially restorable by a restore scope calculator. If all of the tables were restorable, the database file would be fully restorable, and if none of the tables were restorable, the database file would be not restorable.

In one embodiment, calculating the restore scope of a storage component with no outside environment details, the method 200 uses a merging rule: if all components "higher" than the storage component in the graph have a "FULL"

restore scope, then the restore scope of the storage component is "FULL" otherwise the restore scope is "PARTIAL".

At block 220, the method 200 generates an output data structure comprising a portion of the hierarchy of storage components and the corresponding restore designations. A restore manager may take this data structure as input.

Figure 3A:
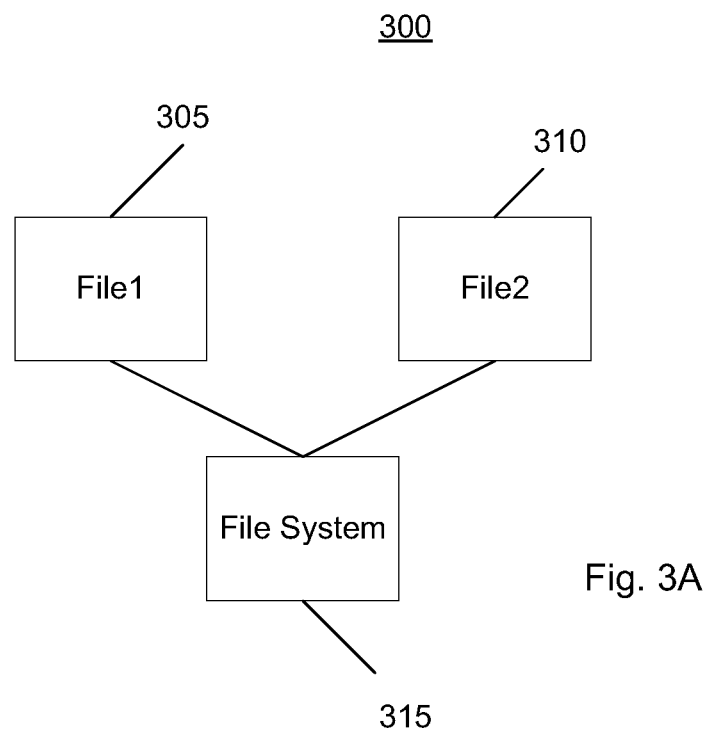
FIGS. 3A-3E are diagrams illustrating an example of the operation of an embodiment of the restore scope calculation method.

FIGS. 3A-3E are diagrams illustrating the operation of an embodiment of the method 200. FIG. 3A illustrates a storage graph 300 which is input to the method 200. The graph includes files 305 and 310 and file system 315. For purposes of the merging rule described above, files 305 and 310 are "higher" than file system 315.

Figure 3B:
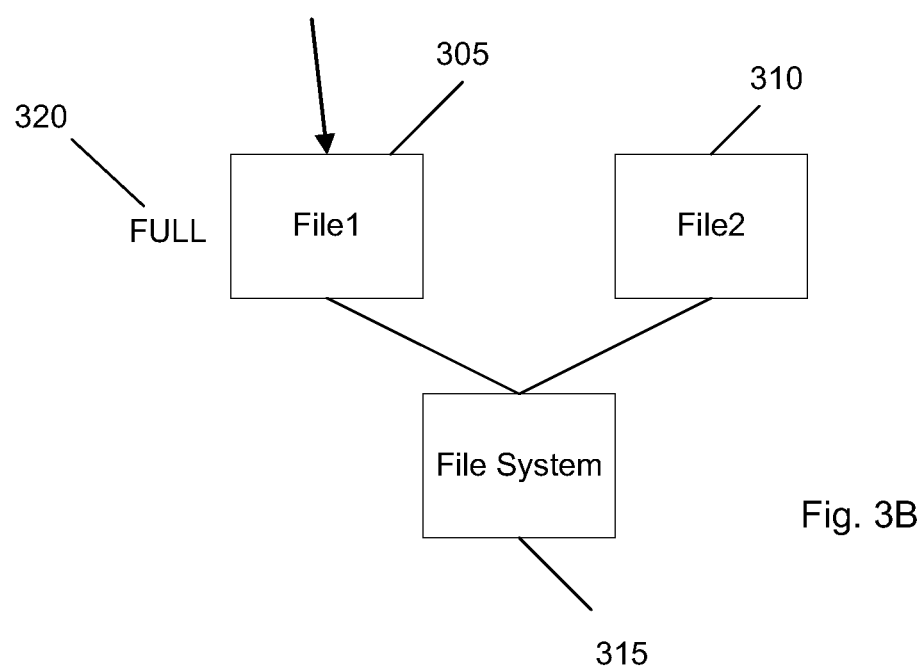

FIG. 3B illustrates the first node traversed by the method 200, which corresponds to file 305. The method 200 designates 320 file 305 as fully restorable. Alternatively, file 305 is included in a restore request and therefore is fully restorable (i.e., a restore operation must restore file 305 to satisfy the restore request).

Figure 3C:
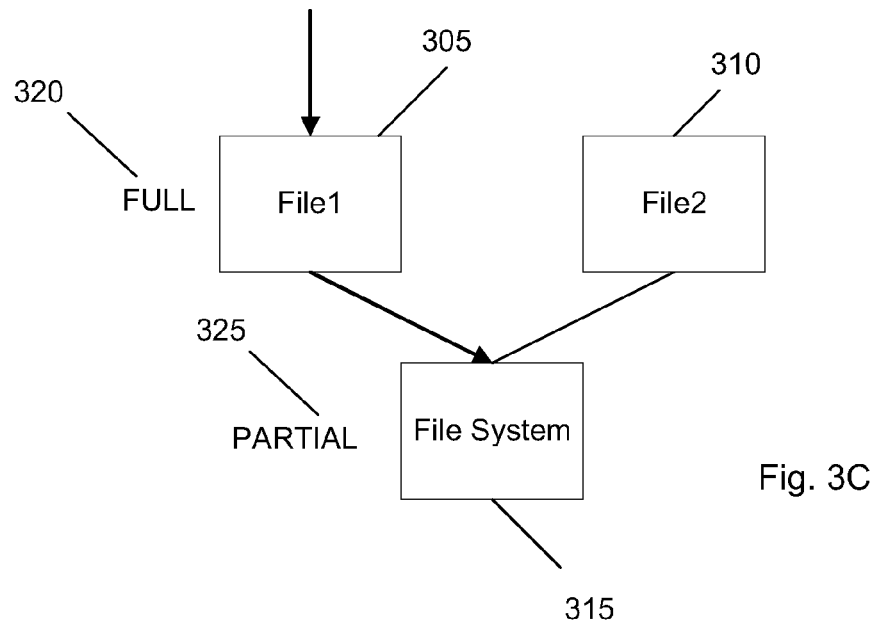
Figure 3D:
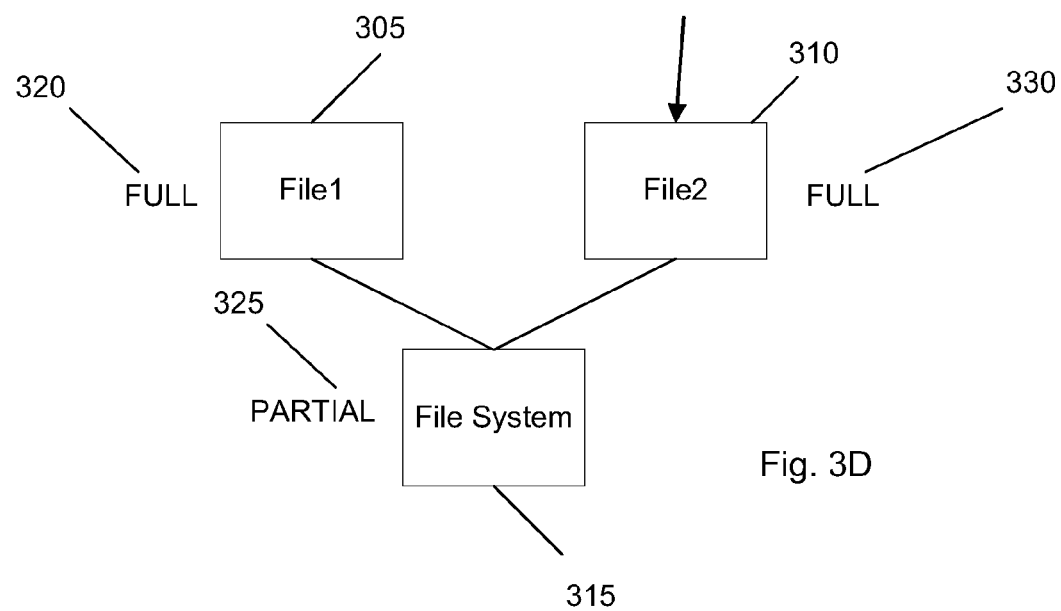

FIG. 3C illustrates the state of the restore scope graph after the method 200 traverses file system 315. File system 315 is initially designated 325 as partially restorable because the restorability designation of file 310 is not known. In one embodiment, since file 310 is related to a storage component being traversed (file system 315), the method 200 determines a restorability designation for file 310, as illustrated in FIG. 3D. The method 200 annotates file 310 with fully restorable designation 330 because the restore request specified that file 310 must be restored.

Figure 3E:
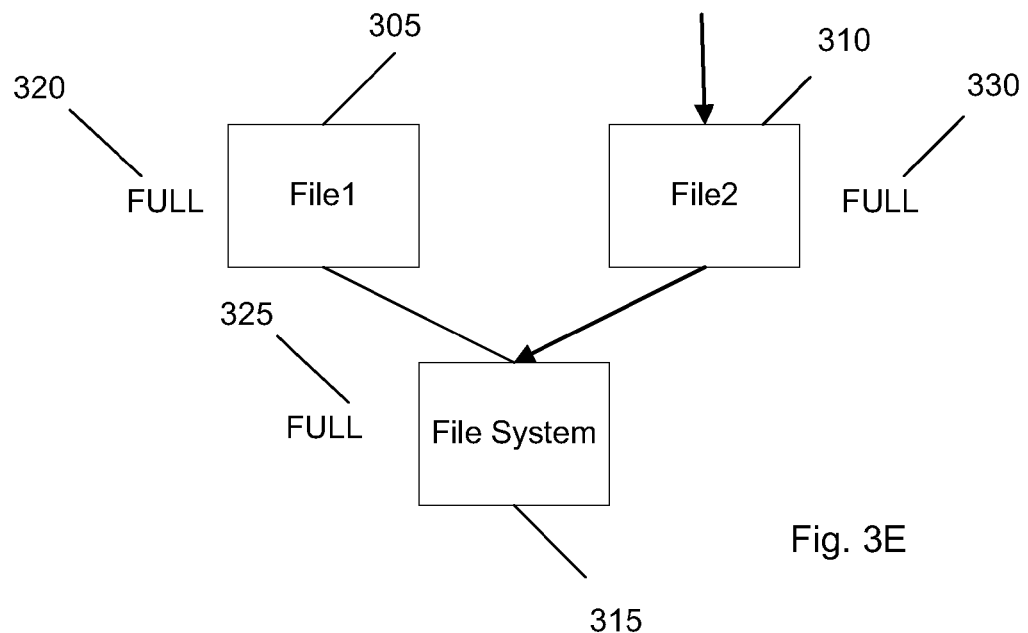
Figure 4:
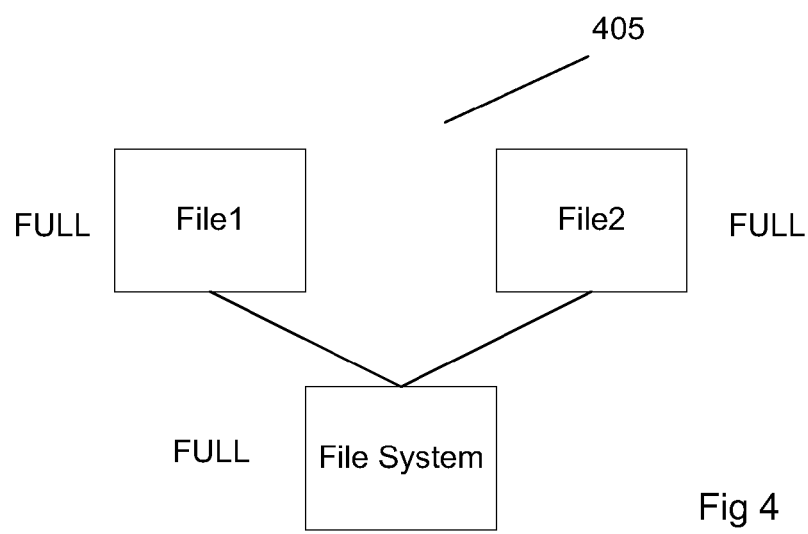
FIG. 4 is a diagram illustrating a restore scope graph output by an embodiment of the restore scope calculation method.

The method 200 updates the designation 325 of file system 315 as illustrated in FIG. 3E. Since file 305 and file 310 are both designated as fully restorable, file system 315 is designated as fully restorable. FIG. 4 illustrates the restore scope graph 405 output by the method 200, which illustrates a fully restorable graph.

Figure 5A:
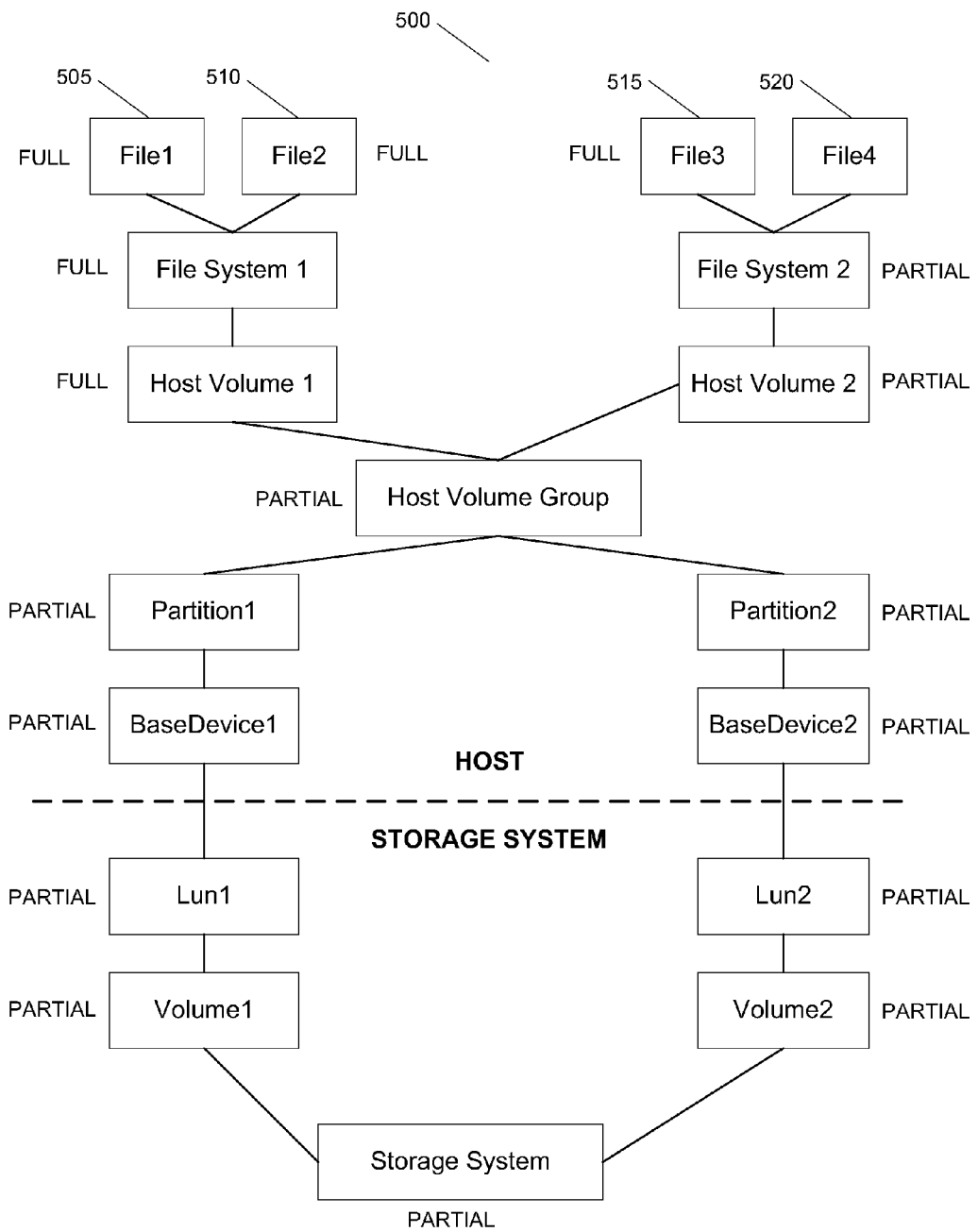
FIGS. 5A and 5B are diagrams illustrating another example of the operation of an embodiment of the restore scope calculator method.
Figure 5B:
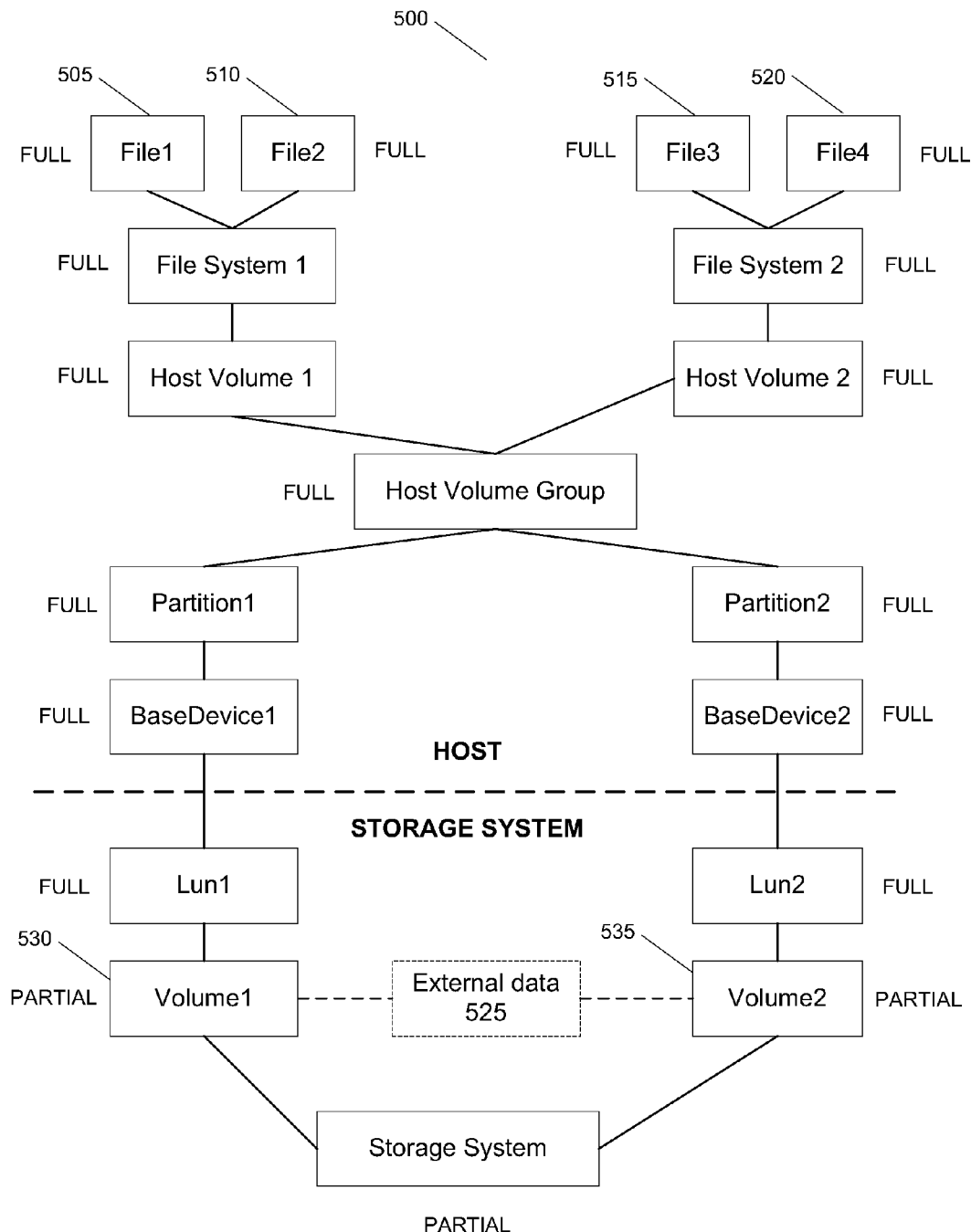

FIGS. 5A and 5B are diagrams illustrating a restore scope graph 500. Files 505, 510, 515, and 520 are to be restored. In one embodiment, the restore scope calculator 125 and discovery manager 105 traverse from the host level to the storage system level. The host level and the storage system level may represent different hardware devices and may be in different locations. FIG. 5A illustrates graph 500 after the method 200 has traversed files 505, 510, and 515. Since file 520 has not been traversed, the storage components "lower" than file 520 that are related to file 520 are designated as partially restorable. FIG. 5B illustrates restore graph 500 after all four files have been traversed. Volumes 530 and 535 remain partially restorable because of external data 525.

Figure 6:
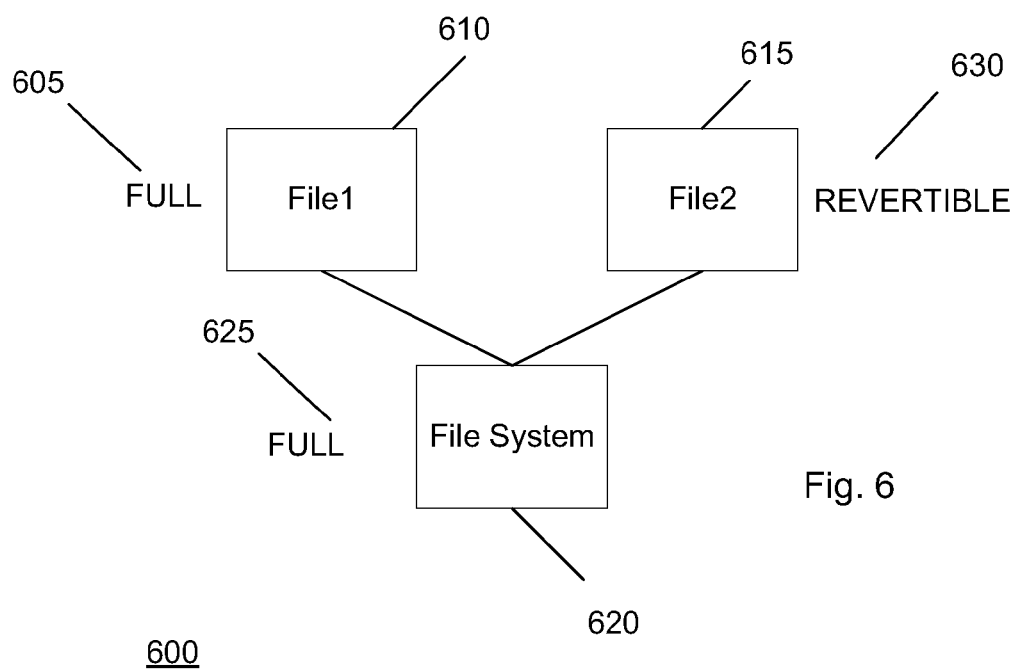
FIG. 6 is a diagram illustrating an embodiment of a revertible storage component.

FIG. 6 is a diagram illustrating an example of a restore scope graph 600 which includes a revertible storage component. File 610 is designated fully restorable 605. File 615 is designated revertible 630. For example, file 615 may be a temporary file. A user may have designated file 615 as revertible from a configuration application, and that user-provided designation is stored as metadata about file 615. The metadata may be stored as part of file 615 or elsewhere. The revertible designation may also be passed as additional parameter to the restore scope calculation method. However, file 615 is capable of being reverted as a side effect of a restore operation. In one embodiment, the revertible designation modifies the merging rule described above by making revertible equivalent to fully restorable for purposes of determining restorability. File system 620 is therefore designated fully restorable 625.

Figure 7:
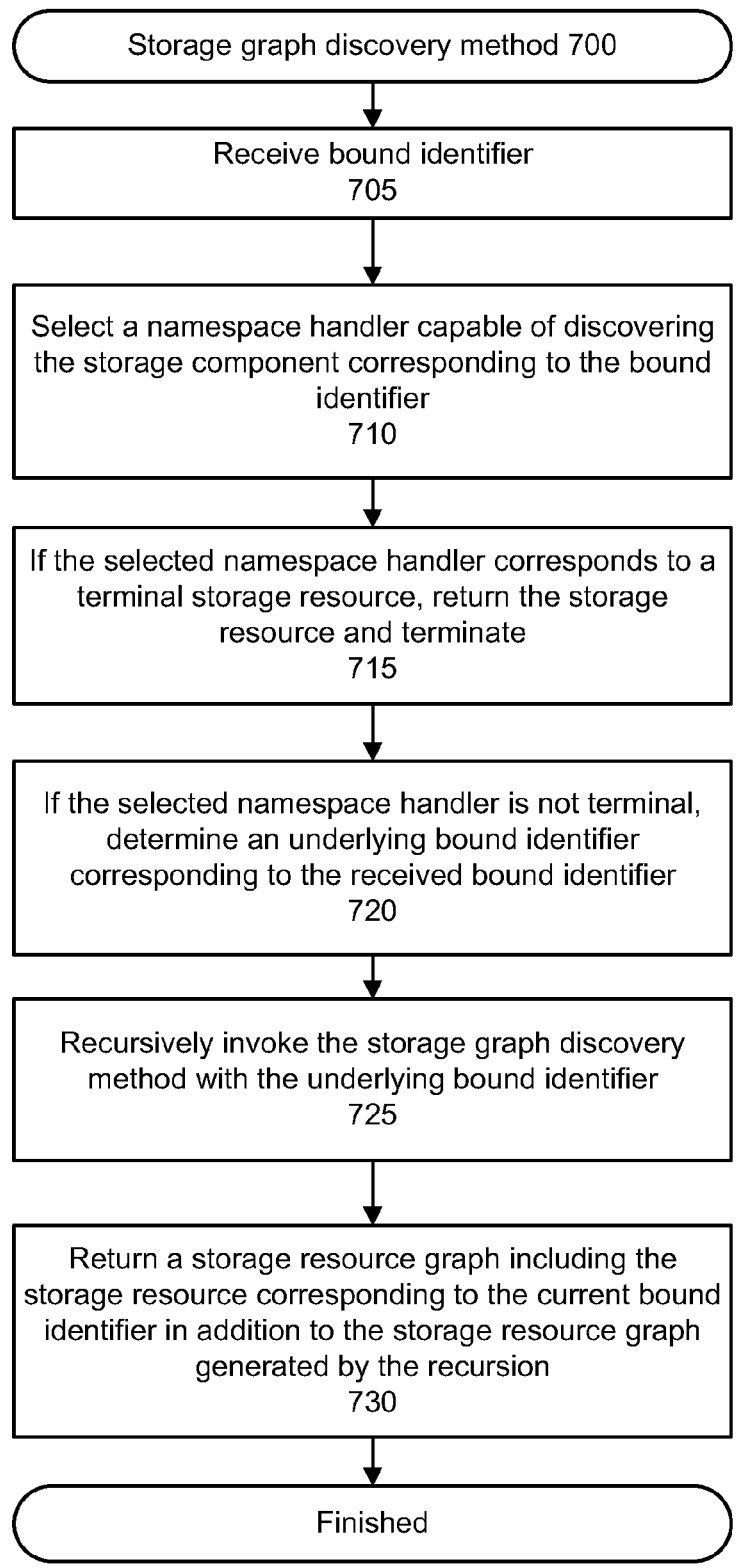
FIG. 7 is a flow diagram illustrating an embodiment of a storage graph discovery method to be performed by a data processing system.

FIG. 7 illustrates a storage graph discovery method 700. The method 700 may be performed by discovery manager 105, which may be implemented using a data processing system as described below in conjunction with FIG. 10. At block 705, the method 700 receives a bound identifier. The bound identifier uniquely identifies at least one storage component within a bounding namespace. At block 710, the discovery handler iterates through a list of registered namespace handlers and selects a namespace handler capable of discovering the storage component corresponding to the bound identifier.

At block 715, the method 700 determines if the selected namespace handler corresponds to a terminal storage component. For example, file system 315 in FIGS. 3A-3E is a terminal storage component. In one embodiment, a namespace handler discovers whether its corresponding storage component is a terminal component. In another embodiment, a namespace handler is preconfigured to report whether its corresponding storage component is terminal. If the namespace handler corresponds to a terminal storage component, the method 700 uses the selected namespace handler to construct a storage graph object corresponding to the bound identifier. The method 700 returns the constructed storage graph object and terminates.

At block 720, if the selected namespace handler does not correspond to a terminal storage component, the method 700 uses the selected namespace handler to map the bound identifier to an underlying bound identifier. For example, in FIG. 3A, file 305 corresponds to the bound identifier, while file system 315 corresponds to the underlying bound identifier.

At block 725, the method 700 recursively invokes the storage graph discovery method 700 with the underlying bound identifier as input. In other embodiments the method 700 is not implemented recursively. At block 730, the method 700 returns a storage resource graph including the storage resource corresponding to the current bound identifier in addition to the storage resource graph generated by the recursive call at block 725.

Figure 8:
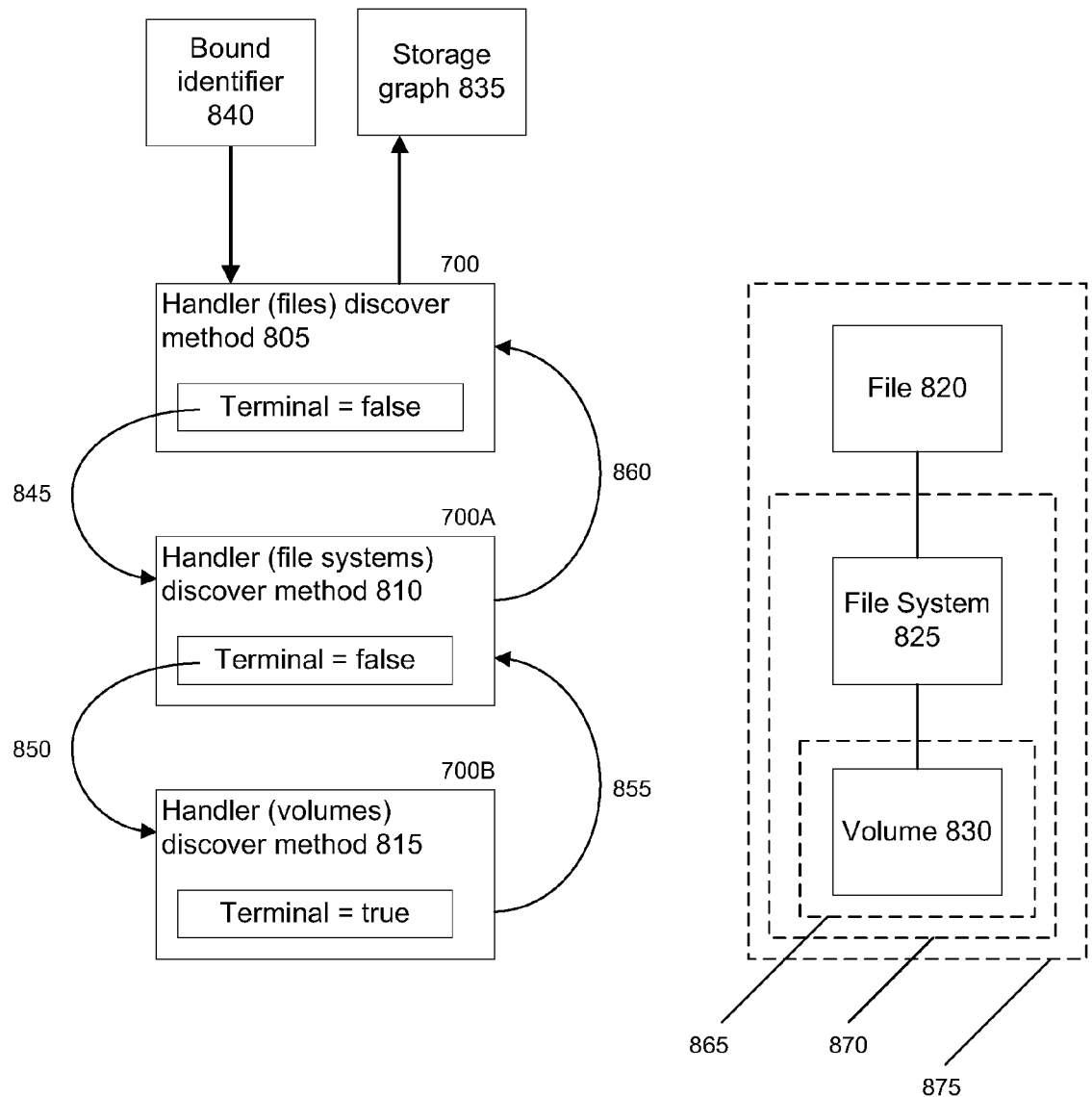
FIG. 8 is a diagram illustrating an example of the operation of an embodiment of the storage graph discovery method.

FIG. 8 illustrates an example of the operation of the method 700. The method 700 receives bound identifier 840, which refers to the storage component 820, a file. The method 700 selects the namespace handler 805, which discovers files. Handler 805 reports to the method 700 that it does not correspond to a terminal storage component. The method 700 uses the handler 805 to map the bound identifier into an underlying bound identifier corresponding to file system 825. The method 700 then recursively invokes 845 itself, which will be referred to as the method 700A. The method 700A and 700B refer to additional instances of the method 700 and are used to clarify the recursive operation of the method 700.

The method 700A receives the bound identifier corresponding to file system 825 and selects namespace handler 810. Handler 810 reports to the method 700A that the bound identifier corresponding to file system 825 is not a terminal storage component. In one embodiment, a namespace handler terminates the recursion if the node it is responsible for discovering is actually a terminal node in the storage topology (i.e., there is nothing "under" it). In another embodiment, the node is not terminal in the sense of being the final storage component, but rather the handler is configured to discover the remaining nodes in the topology. For example, when an external application programmer interface (API) that a namespace handler uses for discovery returns the full storage stack beneath a node instead of just the node itself. The method 700A uses the handler 810 to map the bound identifier corresponding to file system 825 into an underlying bound identifier corresponding to volume 830. The method 700A then recursively invokes 850 itself, which will be referred to as the method 700B.

The method 700B receives the bound identifier corresponding to volume 830 and selects handler 815. Handler 815 informs the method 700B that the corresponding storage component is terminal. The method 700B constructs a storage graph object corresponding to volume 830 and returns a storage graph containing the object. When the method 700B terminates, it returns a storage graph represented by graph 865 and only contains volume 830. The method 700B returns 855 the graph 865 to the method 700A. The method 700A receives the graph 865 and constructs a new graph 870 that includes graph 865 and adds the graph object corresponding to file system 825. The method 700A terminates and returns 860 the graph 870 to the method 700. The method 700 constructs a new graph 875 which includes graph 870 and the storage graph object corresponding to file 820. The method 700 terminates and returns the storage graph 835, which is illustrated by graph 875.

Figure 9:
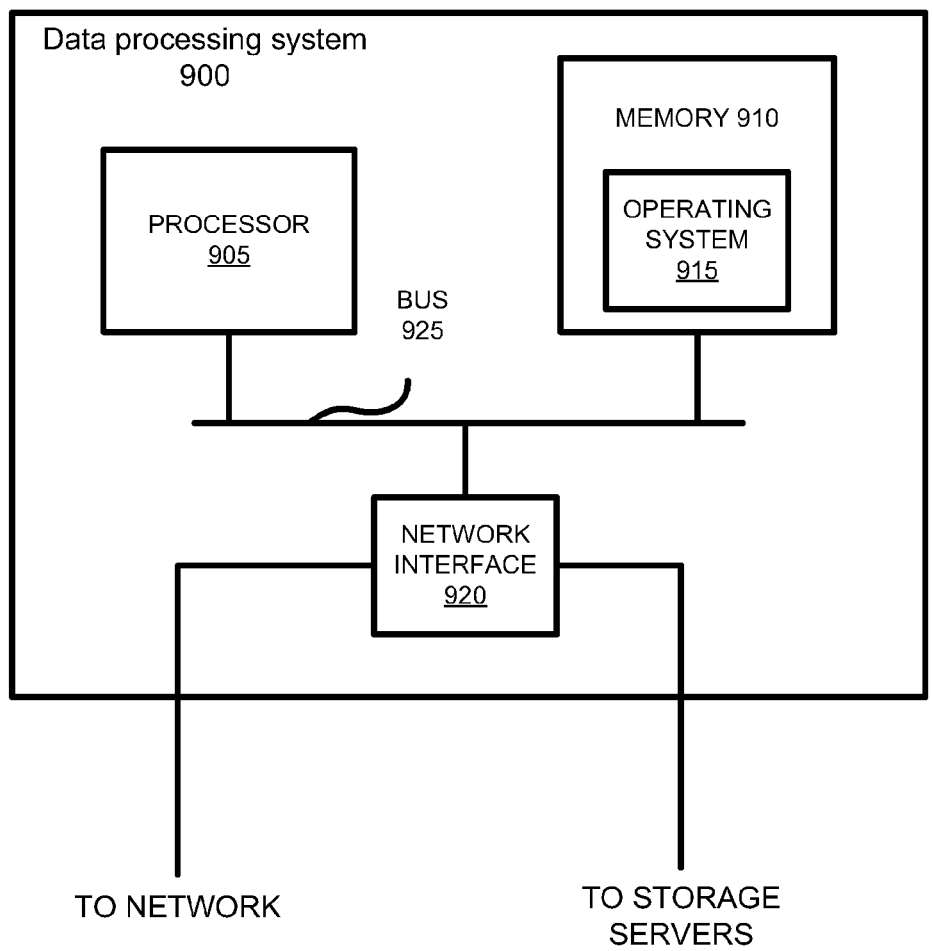
FIG. 9 is a diagram illustrating a system-level overview of an embodiment of dynamic determining of restore scope operating within a storage system.

The storage system 100 of FIG. 1 is now described in more detail with reference to FIG. 9. One embodiment of the storage system 100 may be implemented on a system (e.g., a server) as illustrated in FIG. 9. Referring to FIG. 9, the data processing system 900 includes a processor 905, a memory 910, and a network interface 920, which are coupled to each other via a bus system 925. The bus system 925 may include one or more buses and/or interconnects. The data processing system 900 communicates with a network (e.g., the Internet) via the network interface 920, which can be an Ethernet adaptor, fiber channel adaptor, etc. The network interface 920 may be coupled to a public network, a private network, or a combination of both in order to communicate with a client machine usable by an administrator of the data storage system.

In one embodiment, the processor 905 reads instructions from the memory 910 and executes the instructions. The memory 910 may include any of various types of memory devices, such as, for example, random access memory (RAM), read-only memory (ROM), flash memory, one or more mass storage devices (e.g., disks), etc. The memory 910 stores instructions of an operating system 915. The processor 905 may retrieve the instructions from the memory 910 to run the operating system 915. The data processing system 900 interfaces with one or more storage systems, such as storage servers via the network interface 920. In other embodiments, the data processing system 900 may interface with storage servers via a storage adaptor (not shown), which may include a small computer system interface (SCSI) adaptor, fiber channel adaptor, etc. In one embodiment, memory 910 may be a flash-based solid-state device (SSD), sometimes known as a flash drive.

Figure 10:
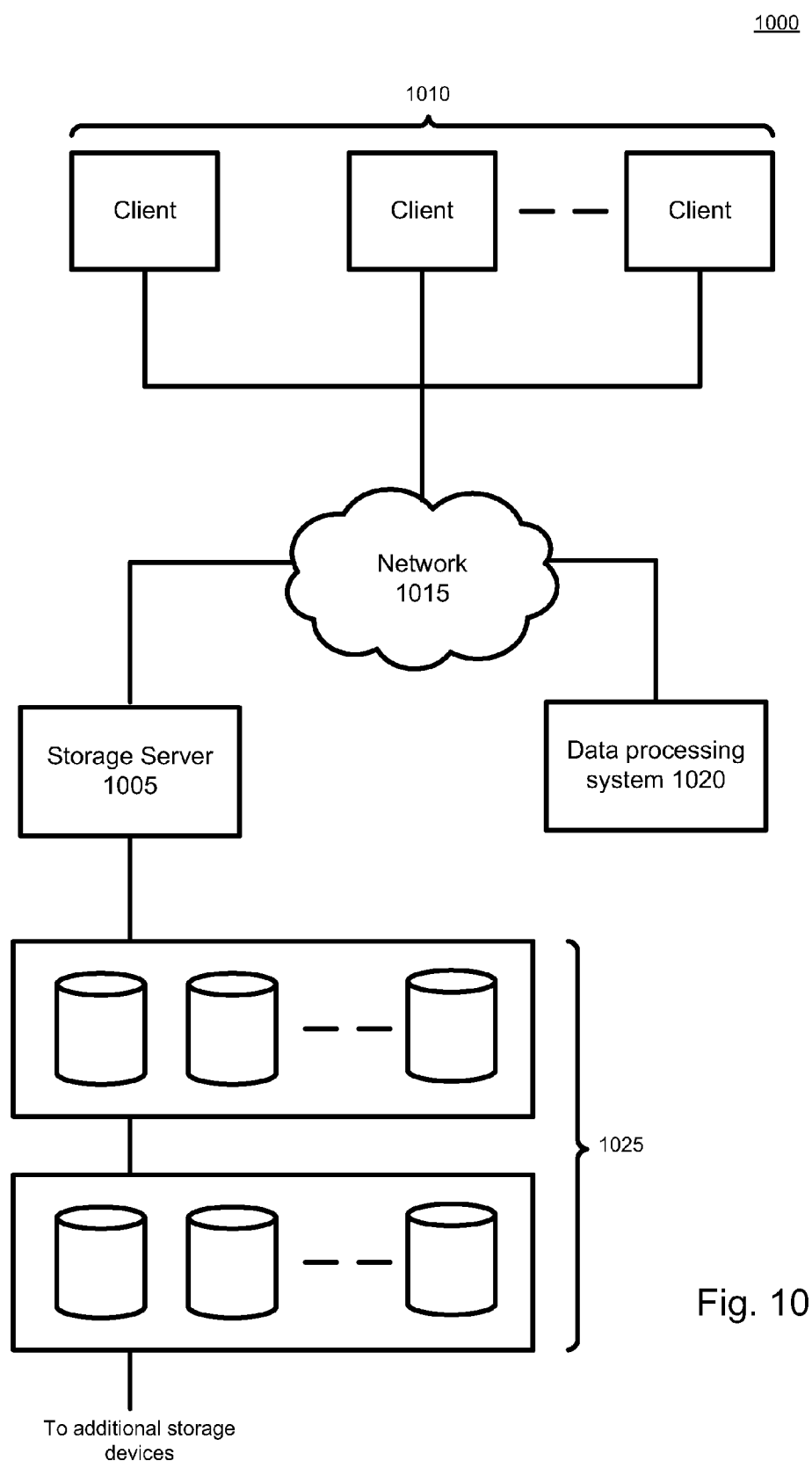
FIG. 10 is a diagram illustrating one embodiment of a data processing system as shown in FIG. 9.

FIG. 10 illustrates a data storage system useable with some embodiments of the present invention. The system 1000 includes a storage server 1005, data processing system 1020, a network 1015, a number of storage devices 1025 coupled to the storage server 1005, and a number of client machines 1010 coupled to the storage server 1005 via the network 1015. The data processing system 1020 may be embodied as illustrated in FIG. 9. Data processing system 1020 is coupled to storage server 1005 via network 1015. The network 1015 may include a wide area network (WAN), a local area network (LAN), etc. The storage devices 1025 may include a number of storage devices (e.g. disks) organized in shelves. The disks may include one or more Redundant Array of Independent Disks (RAID) volumes.

Although illustrated as a self-contained element, the storage server 1005 may have a distributed architecture; for example, it may include a separate N- ("network") blade and D- (disk) blade (not shown). In such an embodiment, the N-blade is used to communicate with clients 1010, while the D-blade includes the file system functionality and is used to communicate with the storage subsystem 1025. The N-blade and D-blade communicate with each other using an internal protocol. Alternatively, the storage server 1005 may have an integrated architecture, where the network and data components are all contained in a single box. The storage server 1005 further may be coupled through a switching fabric to other similar storage servers (not shown) which have their own local storage subsystems. In this way, all of the storage subsystems can form a single storage pool, to which any client of any of the storage servers has access. In one embodiment, storage server 1005 maybe data processing system 900. In another embodiment, DPS 1020 can be a functional component of storage server 1005.

Note that any or all of the components of system 1000 and associated hardware may be used in various embodiments of the present invention. However, it can be appreciated that other configurations of the data storage system may include some or all of the devices disclosed above.

In one embodiment, the system 1000 includes a storage area network (SAN) to transmit read/write requests at the block level of the storage server 180. A block is the basic unit of data used to store data in the SAN. In an alternate embodiment, the system 1000 is a network-attached storage (NAS) system that transmits data at the file level. In the NAS system, complete files are retrieved instead of blocks on a disk. The NAS system uses file access protocols to retrieve data, such as, for example, Network File System (NFS), or Common Internet File System (CIFS). The SAN and the NAS systems may be implemented in a single server or in separate servers.

In practice, the methods 200 and 700 may constitute one or more programs made up of computer-executable instructions. Describing the methods with reference to the flowcharts in FIGS. 2 and 7 enables one skilled in the art to develop such programs, including such instructions to carry out the operations (acts) represented by logical blocks in FIGS. 2 and 7 on suitably configured computers (the processor of the computer executing the instructions from computer-readable storage media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the methods illustrated in FIGS. 2 and 7 without departing from the scope of the invention and that no particular order is implied by the arrangement of blocks shown and described herein.

A restore scope calculator and a discovery manager have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Moreover, the description of FIGS. 9 and 10 is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, may be coupled to the restore scope calculator or the discovery manager. These conventional features have not been illustrated for sake of clarity.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable storage medium" includes any type of volatile or non-volatile storage device that is accessible by a processor.

It will be appreciated that certain embodiments of the present invention may be implemented with solid-state memories including flash storage devices constituting storage array 1025. For example, the restore scope calculator or the discovery manager may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

Therefore, it is manifestly intended that this invention be limited only by the following claims and equivalents thereof.

What is claimed is:

1. A method to determine a restore scope for each storage component in a data structure, wherein the data structure comprises a hierarchy of interrelated storage components and each storage component is one of fully restorable and partially restorable based on the interrelations of the each storage component with a related storage component, the method comprising:

receiving a resource identifier identifying a storage component to be restored;

traversing, by a computer, the hierarchy of interrelated storage components along a primary path specified by a position of the storage component to be restored in the hierarchy of interrelated storage components;

assigning a restore designation for the each storage component as the each storage component is traversed, wherein the restore designation is one of fully restorable, partially restorable, and not restorable based on the interrelationship between the each storage component and the related storage component, wherein designating the each storage component as one of fully restorable, partially restorable, and not restorable further comprises:

determining if a partially restorable storage component is revertible; and changing the restore designation to revertible if the partially restorable storage component is determined revertible;

generating an output data structure comprising a portion of the hierarchy of storage components and the corresponding restore designations;

analyzing the output data structure to determine a plurality of restore operations based on the corresponding restore designations;

determining a duration and a resource cost for each of the plurality of restore operations; and ranking the plurality of restore operations based on the duration and the resource cost of each of the plurality of restore operations.

2. The method of claim 1 further comprising:

displaying the ranked plurality of restore operations on a display device;

receiving a selection of one of the plurality of restore operations; and performing the selected restore operation.

3. The method of claim 1 wherein analyzing the output data structure further comprises:

analyzing components designated as revertible as if the components are designated as fully restorable.

4. The method of claim 3 wherein a temporary file is designated as revertible.

5. A data processing system comprising:

a processor;

a discovery module to cause the processor to receive a storage component identifier and to recursively build a storage graph containing a plurality of interrelated graph objects, the storage graph representing an underlying storage topology;

a restore scope calculating module to cause the processor to receive the storage graph and a storage component to be restored and to recursively build a restore scope graph containing a plurality of interrelated graph objects annotated as one of fully restorable and partially restorable, the restore scope graph representing a plurality of restore operations determined by the annotations; and an output module to cause the processor to output the restore scope graph;

a restore scope analysis module to cause the processor to determine a duration and a resource cost for each of the plurality of restore operations;

a ranking module to cause the processor to rank the plurality of restore operations according to the duration and the resource cost;

a user interface module to cause the processor to display the ranked plurality of restore operations and to receive a selection of one of the plurality of restore of operations;

a restore operation module to cause the processor to perform the selected restore operation; and a revertible analysis module to receive a selection of revertible components, automatically identify revertible components in the restore scope graph, and to display the revertible components, wherein a revised plurality of restore operations is determined by evaluating revertible components as fully restorable components.

6. The data processing system of claim 5 wherein a temporary file is designated as revertible.

7. A storage system comprising:
   a processor coupled to a memory through a bus;
   executable instructions stored in the memory that cause the processor to perform operations comprising:
      receive a bound identifier, the bound identifier identifying a storage component to be restored and including a namespace bounding the identity of the storage component,
      recursively traverse an arbitrary storage topology composed of a plurality of storage components to build a storage graph representing the arbitrary storage topology, wherein for each traversed storage component, a namespace handler corresponding to that storage component is used to identify an underlying bound identifier, the underlying bound identifier used as a parameter to a subsequent recursion, until a terminal storage component is identified,
      recursively traverse the storage graph to each storage component along a primary path in the storage component as one of partially restorable and fully restorable and to designate storage components interrelated to the each storage component along the primary path as one of partially restorable, fully restorable, and not restorable,
      identify, using restorability designations, a restore operation corresponding to a plurality of interrelated storage components designated as fully restorable, and
      output the restore operation.

8. The storage system of claim 7, the instructions further causing the processor to perform operations comprising:
   identify a not restorable component configured to be revertible,
   designate the not restorable component as revertible, and
   identify a restore operation corresponding to a plurality of interrelated storage components designated as one of fully restorable and revertible.

* * * * *